UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM ELEKTRON, OF FRANKFORT-ON-THE-MAIN, GERMANY, A CORPORATION.

VAT DYE AND PROCESS OF MAKING SAME.

1,016,638.  Specification of Letters Patent.  Patented Feb. 6, 1912.

No Drawing.  Application filed May 4, 1911.  Serial No. 624,999.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with post-office address Dreieichsring No. 18, have invented new and useful Improvements in Vat Dyes and Processes of Making Same, of which the following is a specification.

My invention relates to the manufacture and production of new vat dyestuffs of the anthraquinone series containing the pseudoazimino radical,

The new vat dyestuffs are produced by acting with oxidizing agents upon azo dyestuffs, obtained by combining β-diazo compounds of the anthraquinone series with β-amino derivatives of the naphthalene series. Consequently ortho-amino-azo dyestuffs are oxidized of the general formula:

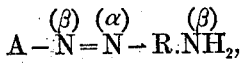

wherein A means an anthraquinone radical and R a naphthalene radical.

The oxidizing process may be performed either in acid or alkaline solution. The simplest representative of these bodies is the product of oxidation of the azo dyestuff from β-diazo-anthraquinone and β-naphthylamin, which may be called α-β-naphthylene-pseudoazimino-β-anthraquinonyl:

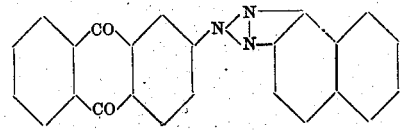

according to the nomenclature used by Zincke (*Berichte der Deutschen Chemischen Gesellschaft* XVIII, page 3136).

In carrying out the new process practically I can proceed as follows, parts being by weight.

Example I: 23 parts of β-aminoanthraquinone are dissolved in 100 parts of concentrated sulfuric acid. The solution is diluted with ice and diazotized by means of 7 parts of sodium nitrite dissolved in 100 parts of water. The diazo solution is added to a slightly acid solution containing 15 parts of β-naphthylamin. The formation of dyestuff is completed by addition of sodium acetate, sodium carbonate or caustic soda lye. The dark violet precipitated azo dyestuff is filtered off washed out and dried. 100 parts of the thus obtained azo dyestuff are dissolved in 500 parts of nitrobenzene and oxidized at about 120° C. by successive addition of a solution of about 100 parts of sodium dichromate in 500 parts of glacial acetic acid. The product of reaction partially separates from the still warm solution in shape of yellow crystals and is almost completely precipitated when the solution has cooled down. The crystals are filtered off and washed with alcohol. The thus obtained α-β-naphthylene-pseudo-azimino-β-anthraquinonyl can be obtained absolutely pure by recrystallizing it from nitrobenzene. The melting point of the recrystallized product is about 300° C. It is insoluble in the most organic solvents at atmospheric temperature; it dissolves in concentrated sulfuric acid with brownish-orange to red-brown color and is precipitated from this solution by addition of water in shape of yellow flakes. With alkaline hydrosulfite solution a brown-violet vat is obtained, from which cotton is dyed dark-brown violet shades, which by oxidation are turned into yellow-ones of very good fastness to washing and chlorin.

Example II: 45 parts of β-aminoanthraquinone are diazotized as set forth in Example I and combined with 17 parts of 2:6-naphthylene-diamin. The insoluble black violet azo dyestuff is oxidized as described in Example I. The thus obtained product of reaction is a yellow-brown powder, which dissolves in concentrated sulfuric acid with brown color from which solution it is precipitated by diluting it with water in shape of yellow-brown flakes. The dyestuff dyes cotton brownish-yellow-shades. In this example two molecules of diazotized β-aminoanthraquinone are combined with one molecule 2.6-naphthylenediamin.

Example III: 60 parts of 2:6-diaminoanthraquinone are dissolved in 200 parts of concentrated sulfuric acid 66° Bé., diluted with ice and diazotized by means of 35 parts of sodium nitrite dissolved in the necessary quantity of water. The tetrazo compound is combined with 75 parts of β-naphthylamin. The dyestuff is oxidized substantially as described in Example I. The product of oxidation, containing the azimino radical twice is a brown-yellow powder, which dissolves in concentrated sulfuric acid with yellowish-brown color. The dyestuff dyes cotton orange-yellow shades. In this example one molecule of tetrazotized 2.6-diaminoanthraquinone is combined with two molecules β-naphthylamin.

Example IV: 60 parts of 2:6-diaminoanthraquinone are diazotized substantially as described in Example III and combined with 120 parts of the sodium salt of 2:6-naphthylaminsulfonic acid. The difficultly soluble dark violet azo dyestuff is oxidized in alkaline solution by means of sodium hypochlorite. The thus obtained azimino body is a brownish yellow powder, soluble in concentrated sulfuric acid with like color. By pouring this solution into water the dyestuff is precipitated in shape of yellow flakes. It dyes cotton bright yellow shades.

In analogous manner may be performed the oxidation of azo dyestuffs from other derivatives of the β-aminoanthraquinone for instance from chloro- or nitro-β-aminoanthraquinone.

Instead of the oxidizing agents given in the examples others may be used.

Now what I claim and desire to secure by Letters Patent is the following:

1. The process of manufacturing vat dyestuffs consisting in acting with oxidizing agents upon ortho-amino-azo dyestuffs of the general formula:

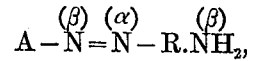

wherein A means an anthraquinone radical and R a naphthalin radical.

2. As a new article of manufacture the vat dyestuffs obtained by oxidation of the azo dyestuff from β-diazo-anthraquinone and β-naphthylamin, which dyestuff dissolves in concentrated sulfuric acid with brownish-orange, to red-brown color, being precipitated from this solution in shape of yellow flakes by addition of water, yielding with alkaline hydrosulfite solution a brown-violet vat, from which cotton is dyed dark-brown violet shades, which by oxidation are turned into yellow ones.

In testimony that I claim the foregoing as my invention, I have signed my name in presence of two witnesses, this 21st day of April, 1911.

AUGUST LEOPOLD LASKA.

Witnesses:
 HERMANN WEIL,
 CARL GRUND.